US006862893B1

(12) United States Patent
Wang

(10) Patent No.: US 6,862,893 B1
(45) Date of Patent: Mar. 8, 2005

(54) AUTOMATIC DEFOG CONTROL METHOD FOR A VEHICLE CLIMATE CONTROL SYSTEM

(75) Inventor: Mingyu Wang, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/678,532

(22) Filed: Oct. 3, 2003

(51) Int. Cl.[7] ................ F25B 49/00; F25D 17/04
(52) U.S. Cl. ................ 62/176.6; 62/150; 62/272; 236/44 C
(58) Field of Search ................ 62/176.2, 176.6, 62/150, 272; 236/44 A, 44 C

(56) References Cited

U.S. PATENT DOCUMENTS

| | | | |
|---|---|---|---|
| 4,920,755 A | | 5/1990 | Tadahiro ................ 62/171 |
| 5,496,989 A | * | 3/1996 | Bradford et al. ............ 219/497 |
| 5,653,904 A | | 8/1997 | Adlparvar et al. ........... 219/203 |
| 5,701,752 A | | 12/1997 | Tsunokawa et al. .......... 62/183 |
| 6,155,061 A | * | 12/2000 | Davis et al. ............... 62/176.6 |
| 6,508,408 B2 | | 1/2003 | Kelly et al. ............... 236/91 C |
| 6,625,995 B2 | * | 9/2003 | Remond et al. ............. 62/133 |
| 2004/0040321 A1 | * | 3/2004 | Lo Presti et al. ............ 62/156 |
| 2004/0050072 A1 | * | 3/2004 | Palfy et al. ................ 62/3.4 |
| 2004/0083748 A1 | * | 5/2004 | Homan et al. ............... 62/244 |

FOREIGN PATENT DOCUMENTS

| | | |
|---|---|---|
| DE | 19942286 | 8/2000 |
| JP | 60-248423 | 12/1985 |

* cited by examiner

*Primary Examiner*—Marc Norman
(74) *Attorney, Agent, or Firm*—Patrick M. Griffin

(57) ABSTRACT

A vehicle climate control develops a fog factor signal based on a water vapor mass flow between the windglass and the air in the vehicle cabin, and uses the index to override the normal control settings. The potential for windglass fogging is characterized as a vapor concentration differential, normalized to form a dimensionless indication of fog potential, and fog potential values within a calibrated range are applied to a variable path function for transitioning between normal climate control and full defog control.

6 Claims, 4 Drawing Sheets

AUTOMATIC DEFOG CONTROL METHOD FOR A VEHICLE CLIMATE CONTROL SYSTEM

TECHNICAL FIELD

This invention relates to climate control in a motor vehicle, and more particularly to a method of operation for automatically preventing windglass fogging.

BACKGROUND OF THE INVENTION

In general, vehicle climate control systems include a controller that regulates a number of parameters such as blower motor speed, refrigerant compressor activation and/or capacity, air mixing door position, and discharge temperature. In a manual system, the operator directly or indirectly controls the parameters, while in an automatic system, the parameters are automatically controlled in response to a number of inputs, including cabin air temperature, outside air temperature and solar loading, to regulate the cabin air temperature at a set temperature selected by the operator. In either type of system, front and rear windglass defogging functions are ordinarily manually activated by the operator when the presence of fogging is noticed.

The desirability of providing automatic activation of front and rear defogging functions has been recognized in the prior art. See, for example, the U.S. Pat. Nos. 4,920,755; 5,653,904; 5,701,752; and 6,508,408, the German Patent No. DE 19942286, and the Japanese Patent No. 60-248423. In general, these patents disclose control methodologies that are based either on moisture sensing or on the proximity of windglass temperature to cabin air dewpoint. However, moisture sensing is typically impractical and/or prohibitively expensive in a production vehicle, and intuitive controls based on cabin air dewpoint do not accurately characterize fogging potential. Accordingly, what is needed is a practical way of accurately characterizing windglass fogging potential, and a control method for implementing an automatic defogging control based on the fogging potential.

SUMMARY OF THE INVENTION

The present invention is directed to an improved vehicle climate control system that develops a fog factor signal based on a water vapor mass flow between the windglass and the air in the vehicle cabin, and uses the index to override the normal control settings. According to the invention, the potential for windglass fogging is characterized as a vapor concentration differential, normalized to form a dimensionless indication of fog potential, and fog potential values within a calibrated range are applied to a variable path function for transitioning between normal climate control and full defog control.

DESCRIPTION OF THE PREFERRED EMBODIMENT

Figure 1:
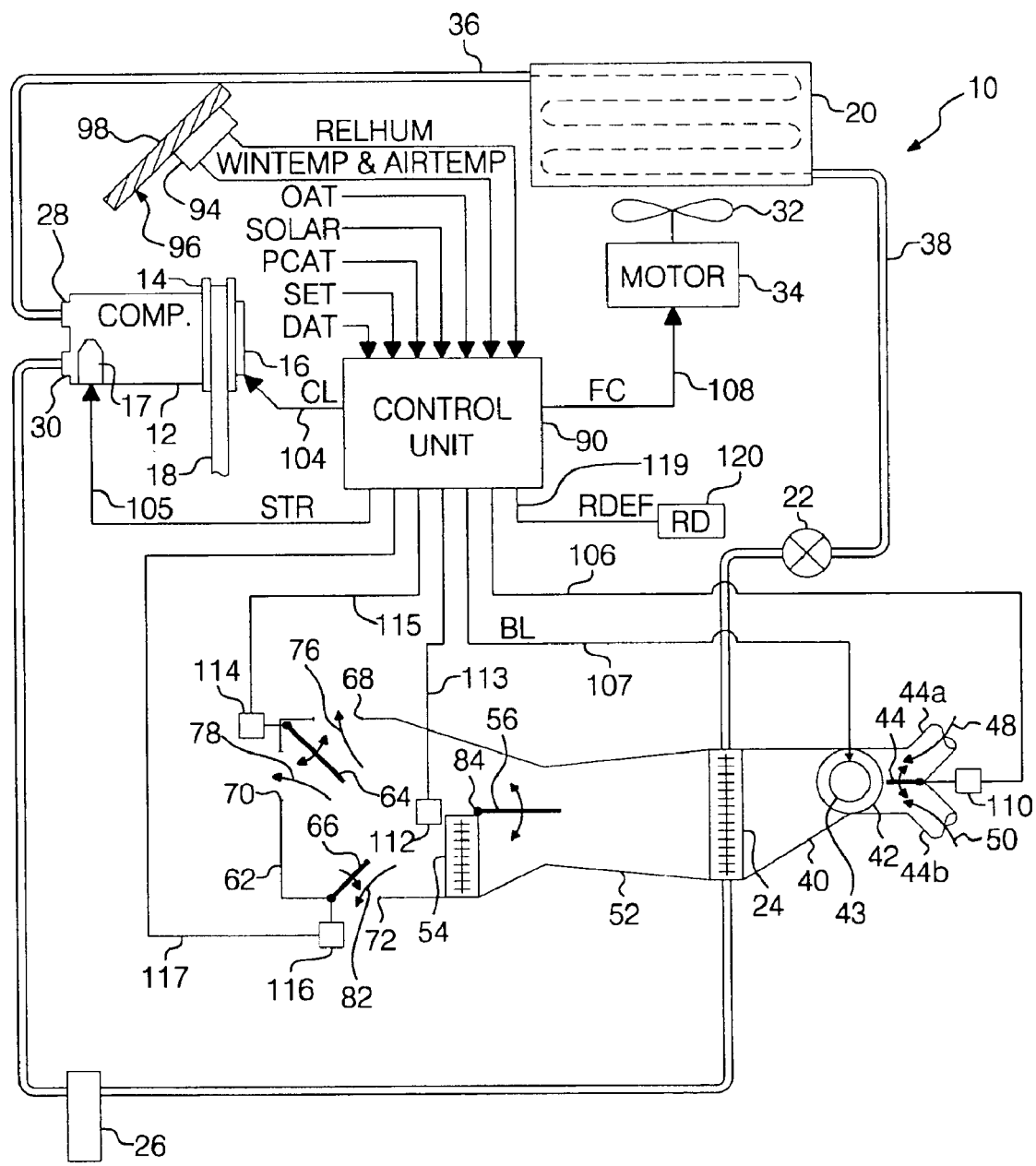
FIG. 1 is a block diagram of a vehicle climate control system according to this invention, including a microprocessor based control unit.

Referring to FIG. 1, the method of this invention is described in the context of an automatic climate control system, generally designated by the reference numeral 10. In the illustrated embodiment, the system 10 includes a variable capacity refrigerant compressor 12 having a stroke control valve 17 that is electrically activated to control the compressor pumping capacity. The compressor input shaft is coupled to a drive pulley 14 via an electrically activated clutch 16, and the drive pulley 14 is coupled to a rotary shaft of the vehicle engine (not shown) via drive belt 18, so that the compressor 12 can be turned on or off by respectively engaging or disengaging the clutch 16. The system 10 further includes a condenser 20, an orifice tube 22, an evaporator 24, and an accumulator/dehydrator 26 arranged in order between the compressor discharge port 28 and suction port 30. The electric drive motor 34 of cooling fan 32 is controlled to provide supplemental airflow for removing heat from high pressure refrigerant in condenser 20. The orifice tube 22 allows the cooled high pressure refrigerant in line 38 to expand in isenthalpic fashion before passing through the evaporator 24. The accumulator/dehydrator 26 separates low pressure gaseous and liquid refrigerant, directs gaseous refrigerant to the compressor suction port 30, and stores excess refrigerant that is not in circulation. In an alternative system configuration, the orifice tube 22 is replaced with a thermostatic expansion valve (TXV); in this case, the accumulator/ dehydrator 26 is omitted, and a receiver/drier (R/D) is inserted in line 38 upstream of the TXV to ensure that sub-cooled liquid refrigerant is available at the TXV inlet.

The evaporator 24 is formed as an array of finned refrigerant conducting tubes, and an air intake duct 40 disposed on one side of evaporator 24 houses a motor driven ventilation blower 42 for forcing air past the evaporator tubes. The duct 40 is bifurcated upstream of the blower 42, and an inlet air control door 44 is adjustable as shown to control inlet air mixing; depending on the door position, outside air may enter blower 42 through duct leg 44a as indicated by arrow 48, and passenger compartment air may enter blower 42 through duct leg 44b as indicated by arrow 50.

An air outlet duct 52 disposed on the downstream side of blower 42 and evaporator 24 houses a heater core 54 formed as an array of finned tubes through which flows engine coolant. The heater core 54 effectively bifurcates the outlet duct 52, and a re-heat door 56 next to heater core 54 is adjustable as shown to divide the airflow through and around the heater core 54. The heated and un-heated air portions are mixed in a plenum portion 62 downstream of re-heat door 56, and a pair of mode control doors 64, 66 direct the mixed air through one or more outlets, including a defrost outlet 68, a panel outlet 70, and a heater outlet 72. The mode control door 64 is adjustable as shown to switch the outlet air between the defrost and panel outlets 68, 70, as indicated by arrows 76, 78, respectively. The mode control door 66 is adjustable as shown to control airflow through the heater outlet 72, as indicted by arrow 82.

The above-described components of system 10 are controlled by the microprocessor-based control unit 90, which is responsive to a number of inputs, including relative humidity (RELHUM), cabin air temperature (AIRTEMP), windglass temperature (WINTEMP), outside air temperature (OAT), solar loading (SOLAR), passenger compartment air temperature (PCAT), a set temperature (SET) and discharge air temperature (DAT). Sensors for generating the RELHUM, AIRTEMP, WINTEMP, SOLAR and PCAT signals are located within the vehicle passenger compartment, and the relative humidity, cabin air temperature and windglass temperature sensors may be co-located in a single module 94 on an inside surface 96 of front windglass 98 as shown. The temperature AIRTEMP is simply the cabin air temperature near the windglass 98. Other inputs not shown in FIG. 1 include the usual operator demand inputs, such as the override controls for mode, blower motor 43 and rear window defogger grid 120.

In response to the inputs mentioned above, the control unit 90 develops output signals for controlling the compressor clutch 16, the capacity control valve 17, the fan motor 34, blower motor 43, and the air control doors 44, 56, 64 and 66. In FIG. 1, the output signals CL, STR, FC and BL for clutch 16, stroke control valve 17, condenser fan motor 34, and blower motor 43 appear on lines 104, 105, 108 and 107, respectively. The air control doors 44, 56, 64, 66 are controlled by corresponding actuators 110, 112, 114, 116 via lines 106, 113, 115 and 117, respectively. Additionally, the control unit 90 generates an output signal RDEF on line 119 for controlling activation of rear window defogger grid 120.

The present invention is directed to a control carried out by the control unit 90 that automatically overrides the default climate control settings (manual or automatic) for the purpose of preventing the formation of fog on the windglass 98 or eliminating fogging as quickly as possible. Since windglass fogging can occur at different times and for a number of different reasons, reliable prevention of windglass fogging requires an accurate and physics-based judgment of the fogging potential. This is achieved according to the present invention by characterizing the transfer of water vapor between the windglass 98 and the cabin air in terms of easily measurable parameters such as WINTEMP, RELHUM and AIRTEMP.

Fundamentally, the mass flow rate of moisture $\dot{m}$ between the cabin air and the interior surface of windglass 98 can be expressed in terms of a moisture concentration differential as follows:

$$\dot{m} = h_m(\rho_{w,i} - \rho_{w,g}) \quad (1)$$

where $h_m$ is a mass transfer coefficient, $\rho_{w,i}$ is the partial density of water vapor in the cabin air, and $\rho_{w,g}$ is the partial density of water vapor at the surface of windglass 98. This relationship can be used to define a non-dimensional vapor flow indicator $\Omega$ as follows:

$$\Omega = (\rho_{w,i} - \rho_{w,g})/\rho_{w,g} \quad (2)$$

When water mist is present on the windglass 98, either during fogging or defogging, the interfacial water exists in a saturated state. As a result, the partial density $\rho_{w,g}$ is essentially equivalent to the saturation density of water vapor at the temperature $T_g$ (that is, $\rho_{w,g,sat}$). Thus, vapor flow indicator $\Omega$ may be expressed as:

$$\Omega = (\rho_{w,i} - \rho_{w,g,sat})/\rho_{w,g,sat} \quad (3)$$

Figure 2:
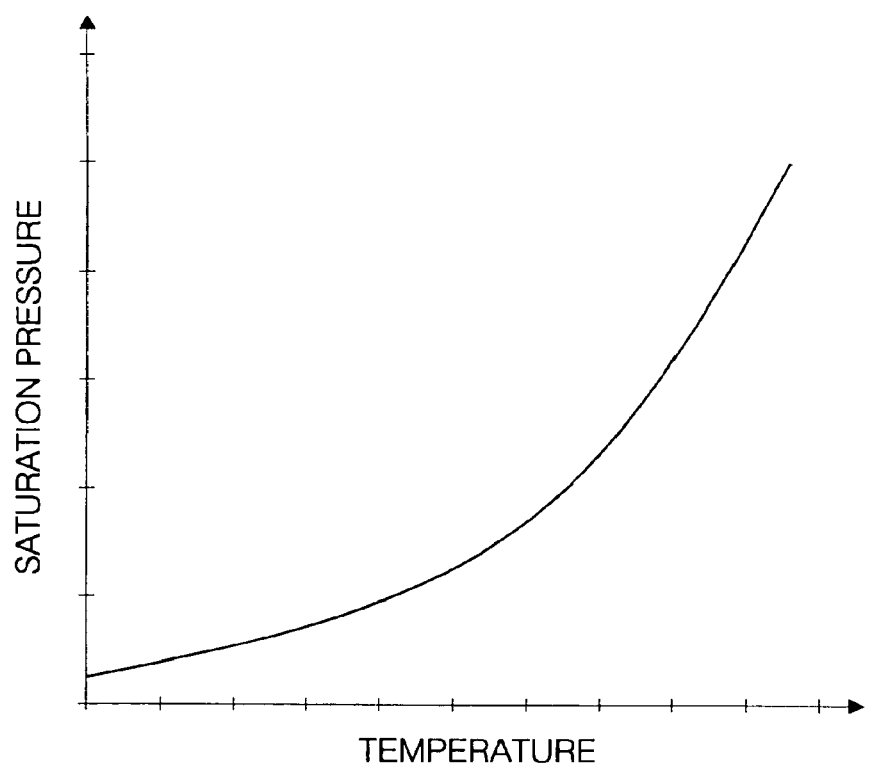
FIG. 2 is a graph depicting saturated water vapor partial pressure of air as a function of temperature.

Since the vapor partial pressure $P_{w,g,sat}$ corresponding to $\rho_{w,g,sat}$ can be easily determined from the windglass temperature $T_g$ (WINTEMP) using a vapor saturation curve such as depicted in FIG. 2, it is more convenient to express the vapor flow indicator $\Omega$ in terms of vapor partial pressures using the ideal gas equation. Thus, the vapor flow indicator $\Omega$ may be expressed as:

$$\Omega = \frac{P_{w,i} T_g}{P_{w,g,sat} T_i} - 1 \quad (4)$$

Also, since $P_{w,i}$ may be expressed as the product of $P_{w,i,sat}$ and the relative humidity $R_h$ (RELHUM), $\Omega$ may be also be expressed as:

$$\Omega = \frac{P_{w,i,sat} T_g}{P_{w,g,sat} T_i} Rh - 1 \quad (5)$$

Finally, since the ratio $T_g/T_i \approx 1$ for purposes of equation (5), the vapor flow indicator $\Omega$ can be simply defined as:

$$\Omega = \frac{P_{w,i,sat}}{P_{w,g,sat}} Rh - 1 \quad (6)$$

In summary, a dimensionless vapor flow indicator $\Omega$ may be easily computed using the measured parameters AIRTEMP, WINTEMP and RELHUM and a vapor saturation curve look-up table. Being derived from the vapor mass flow equation (1), the indicator $\Omega$ essentially reflects the rate of fogging or defogging of windglass 98 without regard to the ambient air temperature. During fogging, $\Omega$ has a positive value, indicating a flow of water vapor from the cabin air to the windglass 98; during defogging, $\Omega$ has a negative value, indicating a flow of water vapor from the windglass 98 to the cabin air. Ideally, defogging actions could be taken based on whether $\Omega$ is greater or less than zero. If it is less than zero, no action would be taken, since the relatively dry cabin air takes the moisture away from windglass 98. Conversely, if $\Omega$ is greater than zero, defogging action would be taken to eliminate fog from windglass 98 to maintain clear vision for driving. As the fogging potential becomes greater and greater, progressively more intensive actions would be taken to counter the higher moisture flow toward windglass 98 for fog-free operation. As a practical matter, however, initiating defogging functions only when $\Omega >= 0$ will not provide satisfactory operation. The most obvious reason for this is that other locations on the windglass 98 may form fog earlier than the fog sensor measurement location. There are also factors such as the inaccuracies of the relative humidity, air temperature and glass temperature sensors 94. These factors can all cause premature or belated defogging, resulting in passenger annoyance or poor defogging performance.

Figure 3:
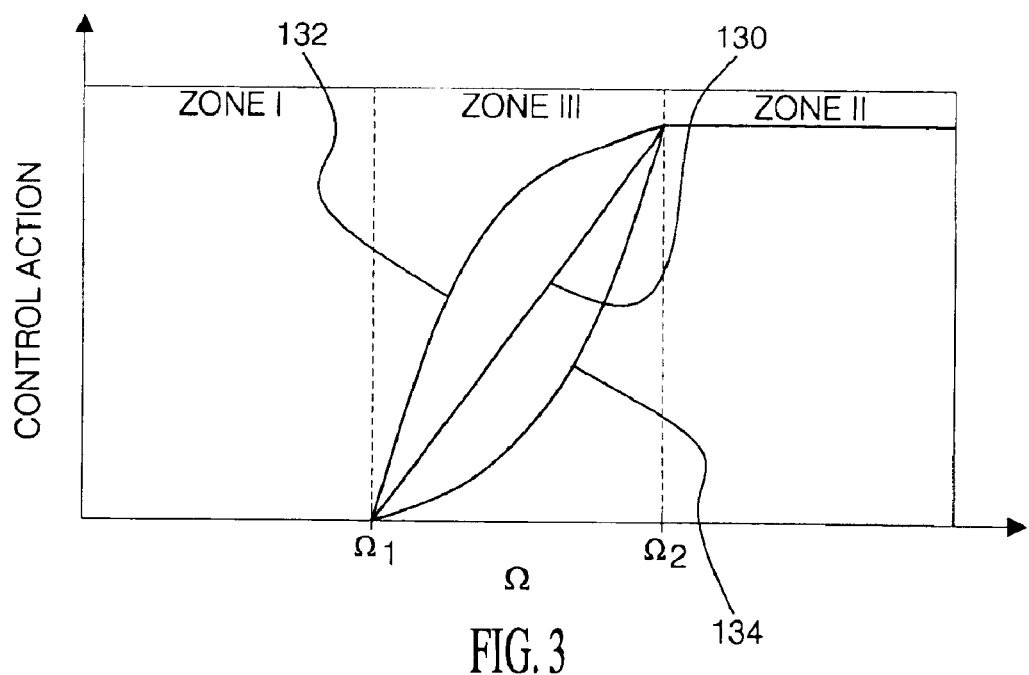
FIG. 3 depicts a three-zone defog control strategy according to this invention.

Accordingly, the defog control of the present invention is preferably carried out with a three-zone control strategy, as illustrated in FIG. 3. The reference values $\Omega_1$ and $\Omega_2$ divide the range of possible vapor flow indicator values into a first region ($\Omega < \Omega_1$) where the air is sufficiently dry that no defogging action is required, a second region ($\Omega > \Omega_2$) where heavy fogging is expected and maximum defogging action is required, and a third region ($\Omega_1 < \Omega < \Omega_2$) of possible fogging between the first and second regions. The first, second and third regions are identified in FIG. 3 as ZONE I, ZONE II and ZONE III, respectively. The reference values $\Omega_1$ and $\Omega_2$ thus essentially define a tolerance band in which the control transitions between the default climate control strategy and a full defogging functionality. The width of the tolerance band can be analytically determined through error analysis of the temperature and humidity sensors, or may be calibrated in an environmental tunnel that is capable of regulating humidity. The location of the tolerance band can be offset to the right or to the left according to whether the sensor 94 is placed at a location that fogs earlier or later than the rest of the windglass 98. In general, $\Omega_1$ controls the onset of the auto defog system, while $\Omega_2$ allows adjustment of the aggressiveness of the system reaction. If desired, $\Omega_1$ and $\Omega_2$ can additionally be calibrated as a function of the ambient temperature, which effectively allows the calibrator to set different boundaries for different seasons or climates.

The trace(s) depicted in FIG. 3 represent the amount or degree of defogging control action to be taken by control unit 90. In Zone I where $\Omega<\Omega_1$, the defog control is inactive, and the control unit outputs are the default control settings. In Zone II where $\Omega>\Omega_2$, the maximum control setting override is put into effect, and in Zone III, a partial control setting override is put into effect. The control path function in Zone III may be proportional as indicated by the linear trace 130, or nonlinear as indicated by the traces 132 and 134. The nonlinear control path designated by the trace 132 provides a relatively aggressive defogging response; it can be used to initiate preemptive defogging response in anticipation of fog formation, or can used to compensate for the slow response of certain relative humidity sensors. On the other hand, the control path designated by the trace 134 provides a subdued response at the early stage of fogging and a steep ramp-up near the upper limit; this response characteristic can be used to optimize passenger comfort at the early stages of fogging while still ensuring sufficient defogging when the fogging risk is more significant.

In a preferred implementation of this invention, the vapor flow indicator $\Omega$ is normalized in terms of the reference values $\Omega_1$ and $\Omega_2$ to define a fogging potential $\theta$ as follows:

$$\theta = \frac{\Omega - \Omega_1}{\Omega_2 - \Omega_1} \tag{7}$$

In Zone I, $\theta<0$, in Zone III, $0<\theta<1$, and in Zone II, $\theta>1$. The fogging potential $\theta$ is linear to the severity of the fogging risk and gives a sense of the fogging severity in understandable terms: 0% (0) is no fogging and 100% (1) is heavy fogging. The control path calibration for Zone III can be advantageously implemented by defining a fog factor $\alpha$ that is a power function of $\theta$ as follows:

$$\alpha = \theta^n \tag{8}$$

Figure 4:
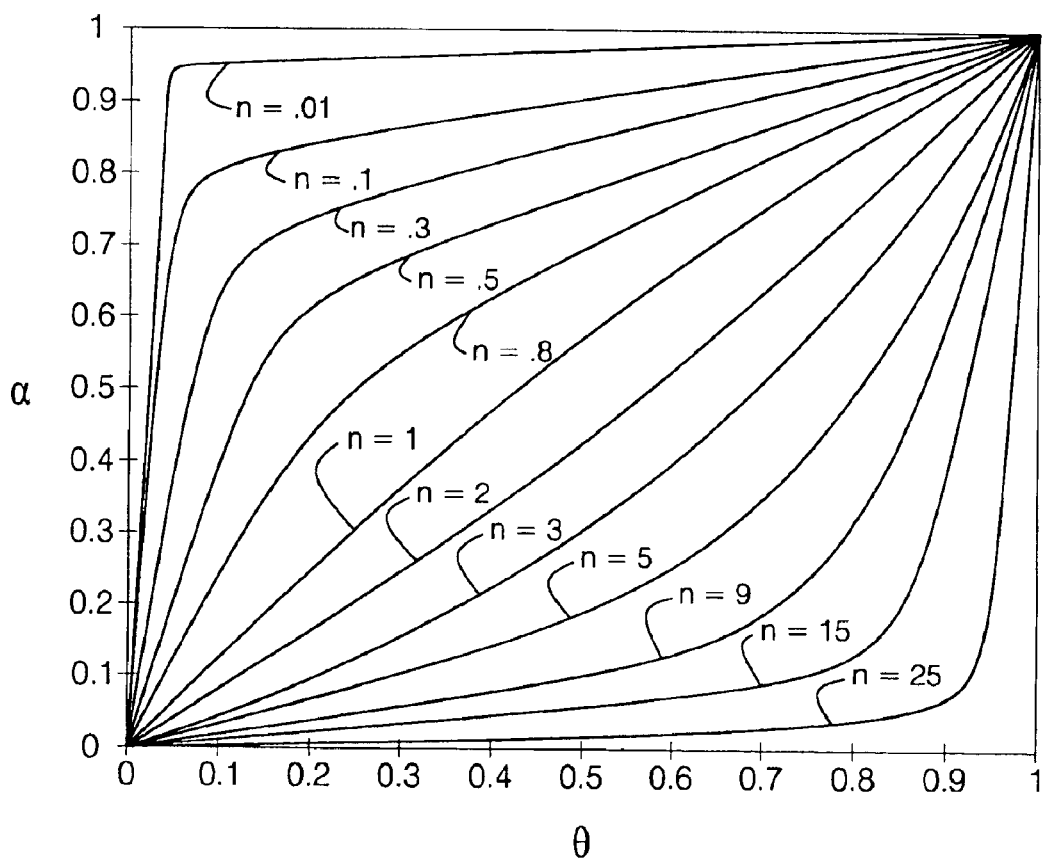
FIG. 4 depicts a variable path control function used in connection with the three-zone defog control strategy of FIG. 3.

The exponent "n" in the power function allows different control paths to be selected as illustrated in FIG. 4. When the exponent n is in the range of zero to one, the corresponding control paths provide relatively aggressive application of defogging control response; when the exponent n equals one, a linear or proportional response is realized; and when the exponent n is greater than one, delayed response characteristics are realized.

Figure 5:
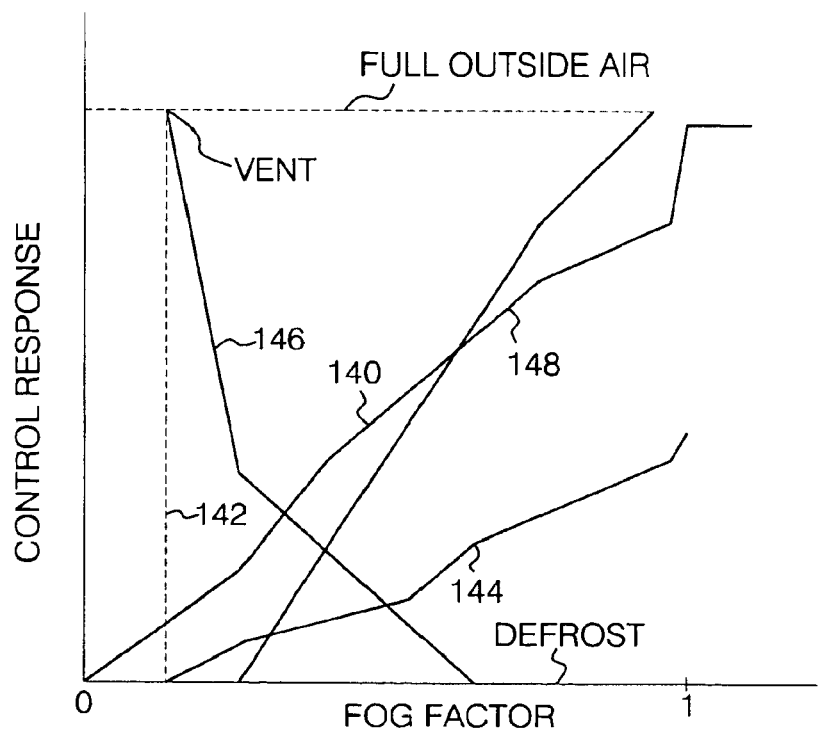
FIG. 5 depicts a climate control override table look-up based on the variable control path function of FIG. 4.

FIG. 5 illustrates possible defogging control responses as a function of the fog factor $\alpha$ for $0 \leq \alpha \leq 1$. The trace 140 represents an offset for the commanded discharge air temperature, and illustrates that as the fog factor $\alpha$ increases above zero, the discharge air temperature is immediately increased, while the other control parameters are kept unchanged. The trace 142 represents an offset for the commanded inlet air door position, and shows that when the fog factor $\alpha$ reaches a predefined threshold, the air inlet door 44 is switched to the full outside air position if it is not there already. The trace 144 represents a minimum blower speed, and illustrates how the blower speed is increased with increasing values of fog factor $\alpha$ to ensure sufficient airflow. The trace 146 represents an air delivery mode setpoint, and shows that the air delivery mode of the HVAC system is gradually shifted toward Defrost mode from a pure Vent mode. Finally, the trace 148 represents an offset for the commanded stroke or capacity of compressor 12, and shows that the compressor stroke increases with increasing values of fog factor $\alpha$. When the Fog Factor reaches one, the discharge air temperature will be at full hot, the air inlet door 44 will be set to full outside air, the blower motor 43 will be operating at maximum speed, and the compressor 12 will be at full stroke. Each of these measures is designed to increase the defogging capability of the air stream impinging on the windglass 98. In the outside air mode, fresh air from outside of the vehicle is introduced into the cabin to flush out the humidity accumulated in the vehicle cabin. Turning on the compressor 12 (when ambient temperature permitting) allows the air stream to be dehumidified in the evaporator 24. Heating the outlet air to a higher temperature before discharge reduces the relative humidity level. Higher airflow rate across the windglass 98 during defogging operation increases the heat and mass transfer coefficient, which allows the speedy removal of accumulated moisture.

Figure 6:
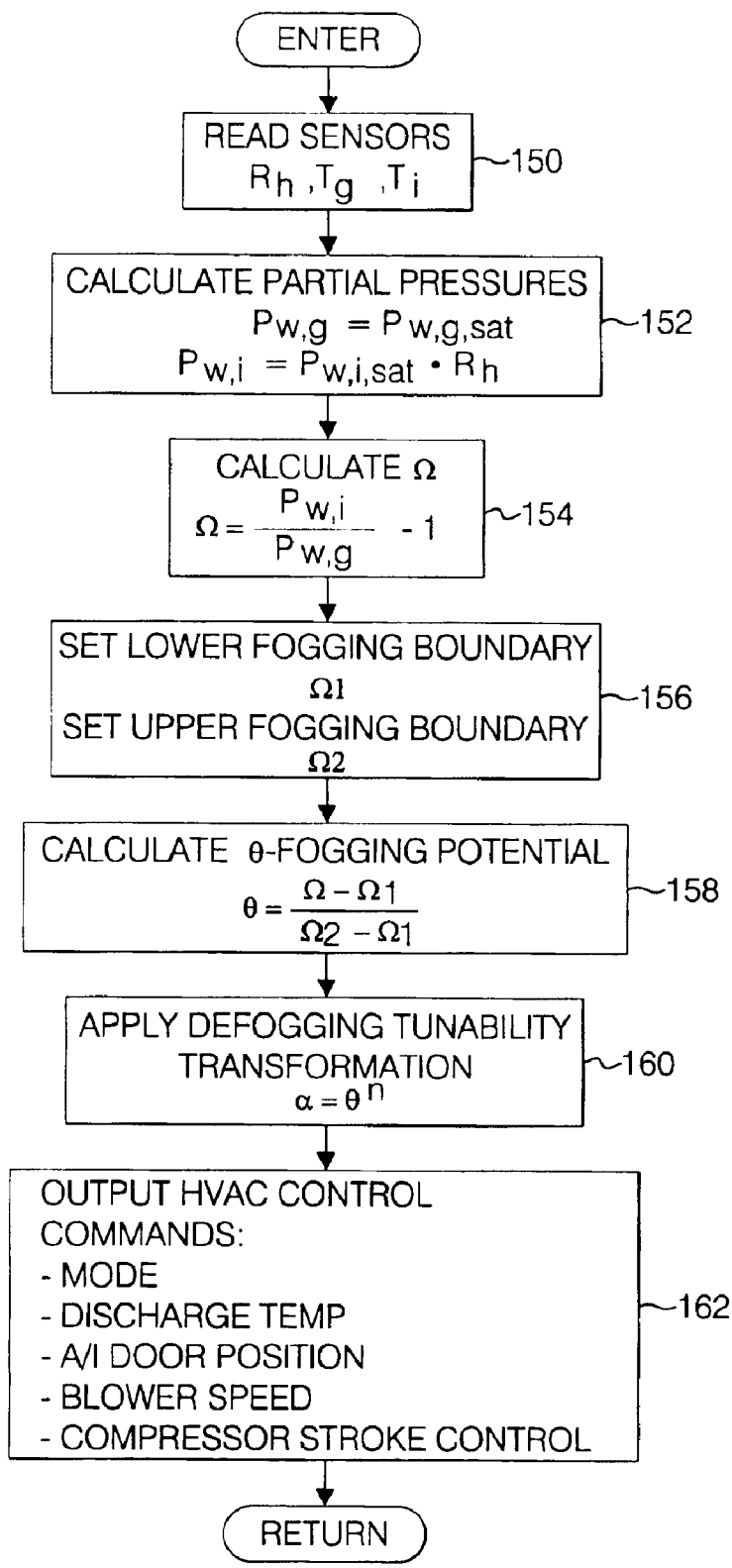
FIG. 6 is a flow diagram representative of a climate control carried out by the control unit of FIG. 1 according to this invention.

FIG. 6 designates a flowchart representative of a software routine executed by the control unit 90 for carrying out the above-described control. After the inputs AIRTEMP, WINTEMP and RELHUM are read at block 150, the block 152 determines the partial pressures Pw,g and Pw,i. As indicated above, Pw,g is determined by table look-up based on WINTEMP, and Pw,I is determined by obtaining the saturation partial pressure Pw,i,sat based on AIRTEMP, and multiplying Pw,i,sat by RELHUM. The block 154 calculates the vapor flow indicator $\Omega$ based on the partial pressures Pw,g and Pw,i, and the block 156 sets the reference values of $\Omega 1$ and $\Omega 2$. As indicated above, $\Omega 1$ and $\Omega 2$ can be either given as constants, or as variables of ambient temperature (OAT). The next step in the execution sequence is the calculation of the fogging potential $\theta$ using equation (7), as indicated at block 158. The fog factor $\alpha$ is then computed at block 160 using equation (8). The block 164 then selects defog control responses as a function of fog factor $\alpha$ by table look-up, completing the routine.

In summary, the control of this invention provides a physics-based override of the normal control outputs of a climate control system to automatically prevent windglass fogging. The control is easily and cost-effectively implemented, and control response region and the aggressiveness of the response can be calibrated to suit the vehicle manufacturer. While this invention has been described in reference to the illustrated embodiment, it is expected that various modifications in addition to those mentioned above will occur to those skilled in the art. For example, the control is equally applicable to a so-called manual control system in which the vehicle operator manually generates the default climate control signals. Likewise, the control is also applicable to systems that incorporate a fixed displacement compressor; in that case, the compressor capacity is adjusted by increasing or decreasing the duty cycle of the compressor clutch 16. Thus, it will be understood that control methods incorporating these and other modifications may fall within the scope of this invention, which is defined by the appended claims.

What is claimed is:

1. A method of operation of a climate control system for a vehicle cabin bounded in part by a windglass, where the climate control system generates control signals for controlling climate control elements to condition air in the cabin, the method of operation comprising the steps of:

computing a vapor flow indicator representative of a moisture mass flow rate between the windglass and the cabin air based on measured cabin parameters; and setting lower and upper threshold values of said vapor flow indicator to define a first range of said vapor flow indicator below said lower threshold value for which the control signals generated by said climate control system are not modified, a second range of said vapor flow indicator above said upper threshold value for which the control signals generated by said climate control system are modified to fully increase a defogging effect of said control elements, and a third range of said vapor flow indicator between said lower and upper threshold values for which the control signals generated by said climate control system are modified to partially increase a defogging effect of said control elements.

2. The method of operation of claim 1, wherein said vapor flow indicator is a dimensionless term based on a difference in moisture concentration between the cabin air and a surface of said windglass.

3. The method of operation of claim 2, including the steps of:

determining a surface temperature of said windglass, a cabin air temperature in the vicinity of said windglass and a relative humidity of cabin air in the vicinity of said windglass; and computing said vapor flow indicator based on the determined windglass temperature, cabin air temperature and cabin air relative humidity.

4. The method of operation of claim 3, including the steps of:

determining saturation partial vapor pressures corresponding to the determined windglass temperature and cabin air temperature; and computing said vapor flow indicator based on the determined saturation partial vapor pressures and the cabin air relative humidity.

5. The method of operation of claim 1, including the step of:

defining a variable control path function of climate control signal modification for vapor flow indicator values between said lower and upper threshold values.

6. The method of operation of claim 5, wherein said variable control path function is a power function that enables calibrator selection of linear and non-linear control paths.

* * * * *